Feb. 10, 1959  F. V. WILKINS  2,873,417
ADJUSTABLE-SPEED ELECTRIC MOTOR CONTROL SYSTEM
Filed April 6, 1955  2 Sheets-Sheet 1

FIG. I.

INVENTOR.
FLOYD V. WILKINS
BY
Curtis, Morris & Safford
ATTORNEYS

Feb. 10, 1959  F. V. WILKINS  2,873,417
ADJUSTABLE-SPEED ELECTRIC MOTOR CONTROL SYSTEM
Filed April 6, 1955  2 Sheets-Sheet 2

INVENTOR.
FLOYD V. WILKINS
BY
Curtis, Morris & Safford
ATTORNEYS

United States Patent Office 2,873,417
Patented Feb. 10, 1959

2,873,417

ADJUSTABLE-SPEED ELECTRIC MOTOR CONTROL SYSTEM

Floyd V. Wilkins, Packanack Lake, N. J.

Application April 6, 1955, Serial No. 499,599

14 Claims. (Cl. 318—327)

The present invention is in the field of adjustable-speed electric motor methods and apparatus, and relates particularly to adjustable-speed systems in which the motor speed can be controlled very accurately throughout a wide range in speed.

It is among the objects of the present invention to provide method and apparatus enabling adjustments of the speeds of electric motors over wide ranges, and enabling the motors to run continuously at full load at any speed setting throughout the range, and to have other good operating characteristics throughout the entire range of speed.

Among the many advantages of the adjustable speed electric motor systems incorporating the invention described herein are those resulting from the fact that they enable precise control of motor speed over extensive speed and load ranges, and the speed adjustment can be continuous or stepless throughout the ranges. In addition, the motors can be operated continuously at or above full rated torque output at any speed within the full range without overheating or other objectionable results. In fact, the motors in these systems can be operated continuously at full rated torque at the very slowest speed in each case while the motor temperature remains substantially below the maximum heat rise allowable under the standard specifications of the NEMA. Moreover, these systems described have a large momentary overload capacity, even at the very lowest speed settings.

Another advantage of the systems described herein is their good speed regulation characteristics so that large variations in the line voltage and in the load applied to the motor have very little effect on motor speed at any speed setting throughout the wide ranges available. These very favorable operating characteristics are obtained without complicated and expensive control arrangements.

Another important advantage of these systems described is the fact that they are true velocity servo systems. The speed of the controlled motor is directly sensed and this direct information about speed is used for control purposes, resulting in very accurate and sensitive control. There are a variety of electric motor speed control apparatus which are known, but a large number of them rely upon indirect measurements and indications of the motor speed for purposes of control. For example, the armature current, the armature back E. M. F., or the applied motor voltage, are often used as indication of motor speed. Such indirect sensing arrangements all have the inherent disadvantage that many factors can influence speed, and thus the indirect indication is usually not a true velocity indication.

The systems described herein use direct velocity sensing for control. A small D. C. pilot generator or tachometer produce an output voltage the value of which indicates directly the motor speed. The output voltage from the tachometer is compared with an adjustable reference voltage representing the desired speed and any difference in the value of the two voltages is amplified and used to control the power input to the motor.

Among the additional advantages of the present method and apparatus are the linearity and repeatability of the control whereby setting the control at a given value produces the same speed under all operating conditions from week to week and month to month, and doubling or halving a setting will accurately double or halve the speed.

In these systems D. C. motors are energized from controllable unidirectional current means, shown here as half-wave thyratron rectifiers coupled to the A. C. power mains and controlled to give the amount of energization required for the desired speed. One of the problems encountered with thyratron control is the fact that at lower speed settings the motor is energized with spaced pulses of current having relatively high peak values so that the R. M. S. (root mean square) heating effect in the motor is high even though the total power input is low. Also, the self-ventilating characteristics of motors at low speed are poor and they easily overheat. Because of the advantages of the method and apparatus described herein the motors run smoother and cooler and over much wider load and speed ranges than in any half-wave or full-wave thyratron rectifier systems of which I am aware.

A still further advantage of the circuits described is the provision of an extremely low resistance series type motor which is operated directly from line voltage through a thyratron. The very low resistance of the motor reduces any heating effect, while the accuracy and stability of the control enable the line voltage operation of the low resistance motor without overloading.

A feature of an illustrative embodiment of the invention is the provision of an inverse rectifier connected across both the field and armature windings of the low resistance series motor, whereby the collapsing field flux is turned into useful current and used to provide additional torque during periods when the main thyratron power rectifier is not conducting. This results in more efficient utilization of the input power to the motor. Peak current values are reduced and the motor runs more smoothly and with markedly reduced heating effects.

Another feature described is a constant voltage reference supply which is energized by A. C. line voltage and which includes only a few relatively simple components, and yet which is so advantageous in operation that it holds its output accurate to less than a small fraction of a percent with wide line voltage variations.

In this specification and in the accompanying drawings, are described and shown embodiments of my invention and various modifications thereof, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt it in various forms, each as may be best suited to the conditions of a particular use.

The various objects, aspects, and advantages of the present invention will be more fully understood from a consideration of the following specification in conjunction with the accompanying drawings, wherein parts and components in Figure 2 performing functions corresponding to those in Figure 1 have the same reference numeral augmented by 200.

Figure 1:
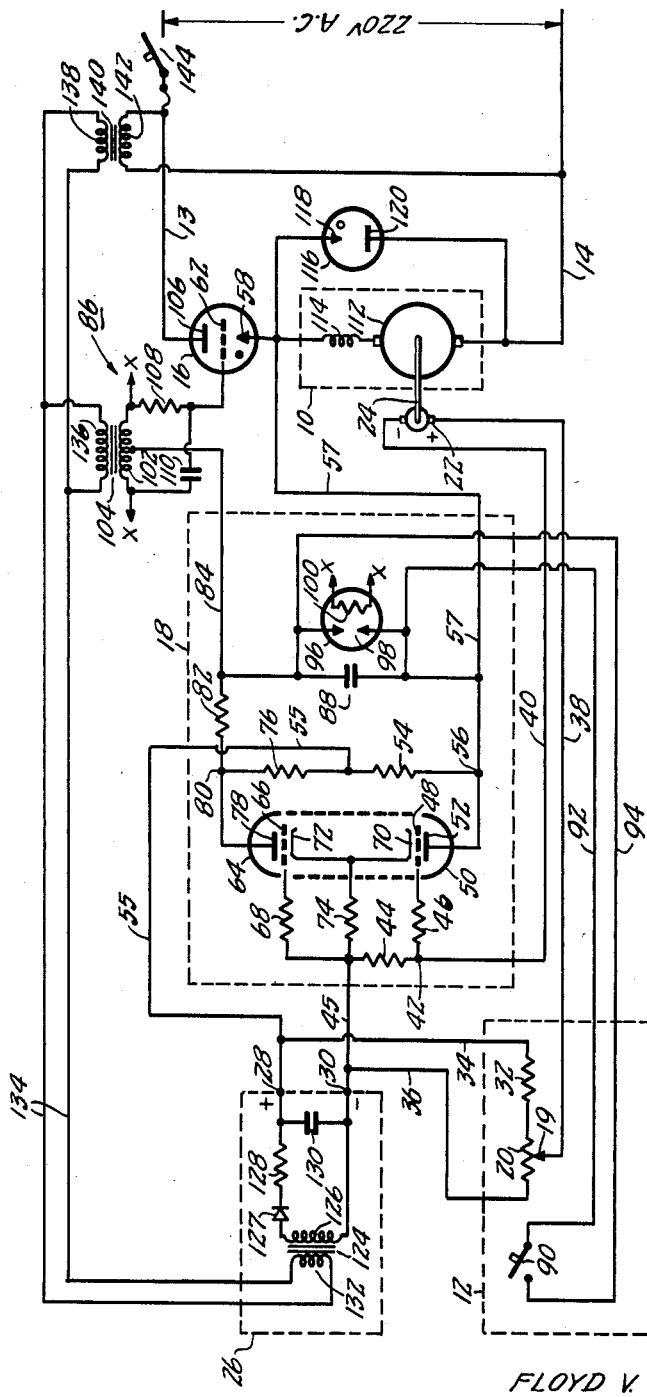
Figure 1 is a schematic circuit diagram illustrating an adjustable-speed electric motor system embodying the present invention.

Referring generally to the system of Figure 1, it includes a D. C. motor, generally indicated within the dotted rectangle 10, which is precisely controlled in accordance with the setting of a control unit 12 which may conveniently be located either close to or remote from the motor. The motor is energized from the A. C. power mains 13 and 14, shown here as carrying 220 volt 60 cycle current, through a controllable unidirectional current means 16, in the form of a thyratron rectifier. This rectifier is controlled by a D. C. amplifier 18 in accordance with the difference between the reference voltage at a movable control contact 19 on a potentiometer 20 in the control unit 12 and the D. C. voltage from apparatus 22 directly sensing motor speed, shown here as a tachometer connected directly to the motor shaft 24. Although a direct motor connection is shown, it is to be understood that the tachometer can also be connected to rotating parts of the equipment, the speed of which is to be controlled, provided the speed of the part used is directly related to motor speed.

To supply the direct voltage for energizing the amplifier 18 and for use in the control unit 12, a power supply circuit 26 is provided, described in detail hereinafter, and having a positive output terminal 28 and an output terminal 30 negative with respect to terminal 28, and which may be considered as the common return or "ground" terminal.

The potentiometer 20 is in series with a speed range setting resistor 32 which is connected by a lead 34 to the positive terminal 28, with the lower end of the potentiometer being connected through a lead 36 to the return terminal 30. Thus, the lower end of the potentiometer 20 is at zero reference voltage, and as the contact 19 is moved up along it, it feeds a progressively higher voltage through a control wire 38 to the positive terminal of the tachometer 22.

In a practical circuit such as shown, the potentiometer 20 is a ten turn precision potentiometer calibrated in terms of the desired R. P. M. For example, assume the motor 10 is rated ½ H. P. at 3600 R. P. M. Then this circuit provides a 30 to 1 speed range, i. e., from 120 R. P. M. to 3600 R. P. M. at full torque output over the entire range.

In operation the contact 19 is moved to the desired speed setting and the corresponding reference voltage is compared with the voltage generated by the tachometer 22, which is desirably a small permanent magnet field D. C. generator, whose voltage is subtracted from that in the wire 38. The difference voltage, if any, representing the deviation of the motor speed from the setting, i. e., the so called "error signal" in a servo loop circuit, is fed back through the lead 40 to the input terminal 42 of the amplifier 18. This error signal is fed across an input resistor 44 having its other end connected by a lead 45 to the common return terminal 30 and is fed through a grid isolation resistor 46 to the grid 48 of a triode 50. The plate 52 of this triode is connected through a plate load resistor 54 and a supply lead 55 to the positive supply terminal 28, the amplified signal appearing at the junction 56 of the plate 52 and the resistor 54 is coupled through a lead 57 to the cathode 58 of the rectifier 16.

Assuming that the motor speed is below the desired point, the amplifier input 42 is driven in a positive direction, increasing the current through the plate resistor 54 and hence lowering the voltage of the junction 56. This reduced voltage is fed to the cathode 58 of the thyratron.

In order to enable discrimination against amplification of any ripple component in the voltage on the lead 40 due to commutation action and brush bounce in the tachometer 22, another triode 64 is provided in the control amplifier 18 and which is arranged so that its output, for A. C. signals, effectively cancels that from the triode 50, while their amplification for D. C. signals is additive. Moreover, these tubes act substantially to balance out any tendency toward amplification changes due to changes in line voltage or tube characteristics, etc.

The grid 66 of triode 64 is connected through a grid return resistor 68 to the lead 45, while the cathodes 70 and 72 of these triodes 50 and 64, respectively, are joined and returned to the lead 45 through a common cathode resistor 74. Because of the coupling through this common cathode resistor, changes in the current through the tube 50 serve to vary the voltage between the grid 66 and cathode 72 in the opposite direction from that between the grid 48 and cathode 70.

Thus, still assuming that the motor speed is below the desired value, an error signal at the input 42 moves the grid 48 in the positive direction, which increases the conduction of triode 50 and causes the cathode 72 to become more positive with respect to its grid 66, correspondingly decreasing the current flowing from the supply lead 55 through the plate load resistor 76 to the anode 78 of the triode 64. As a result, the junction 80 of the plate 78 and resistor 76 moves in a positive direction as the junction 56 becomes less positive. The amplified signal appearing at the junction 80 is fed through a resistor 82, having a function described hereinafter, and then through a lead 84 and through a grid bias and phase shift network, generally indicated at 86 (explained later) to the grid 62.

Thus, when the motor speed is below the desired value, the leads 84 and 57 feed a D. C. voltage difference such as to raise the grid 62 relative to the cathode 58. This D. C. voltage operates in conjunction with the bias circuit 86 to fire the thyratron 16 at an earlier time in its cycle, increasing the proportionate conduction time for the thyratron and increasing the power input to the motor to speed it up to the desired value.

When the motor speed is higher than that called for by the setting of the contact 19, the rectifier grid voltage is lowered with respect to cathode, and the proportionate conduction time for the thyratron is correspondingly cut down to slow the motor.

Any rapid voltage variations or ripples appearing on the amplifier output leads 57 and 84 is cancelled by a condenser 88 connected between the leads 57 and 84. In effect, the series resistor 82 and the shunt condenser 88 serve to filter any A. C. components from the output. This resistor and condenser also effectively provide an appropriate time delay action where rapid changes in the setting of the control contact 19 are involved and when the system is turned on and off by means of the control switch 90 in the control unit 12, as explained in detail hereinafter so as to protect the rectifier 16 and motor 10 from large current overloads.

For example, assume that a great overload is thrown on the the motor 10 causing it abruptly to slow down, then the junction 80 suddenly becomes more positive and the junction 56 more negative. In the absence of any time delay action this large increase in the difference in voltage between points 80 and 56 would throw the thyratron 16 into conduction during substantially the full part of each half cycle. The motor 10 has very low resistance, and at slow speed its back E. M. F. is low, so that a large current overload in the thyratron 16 and motor 10 would result. Because the condenser 88 has a fairly large capacitance, e. g. 1 microfarad and the resistor 82 has a fairly high resistance, e. g. 680,000 ohms, this time delay circuit provides a delay of the order of about ½ second, during which the sudden increase in voltage difference between the points 56 and 80 more gradually appears across the condenser 88 as it charges up to the new value.

The on-off switch 90 in the unit 12, which is used as a stand-by control, is connected by a pair of leads 92 and 94 across the condenser 88. Closing switch 90 short circuits the amplifier output, placing the grid 62 at the same potential as the cathode 58 and stopping all conduction through the thyratron 16 to stop the motor.

In order to protect the circuit during the initial warm-up period of the cathodes, a thermal time delay unit 96 is also connected across the condenser 88. This unit has contacts 98 which remain closed until heating element 100 has warmed up. The element is connected across the low voltage secondary 102 of a step-down transformer 104 in the grid bias circuit 86, as indicated at "X—X."

The reason that the grid bias circuit 86 is used is to make the control action of the rectifier 16 more stable and to enable the rectifier to be fired at any instant during the half cycle in which the anode 106 of the rectifier 16 is positive. A low A. C. voltage from the secondary 102 is fed through a phase shift circuit, including a resistor 108 and condenser 110 with their junction connected to the grid 62. This A. C. bias signal is of the same frequency as the current on the mains 13 and 14 and is arranged to be more than 90° in phase behind the rectifier plate voltage. This bias voltage is added in series with the D. C. control signal between the cathode 58 and grid 62 to produce the desired wide range in control action of the thyratron.

The motor 10 has an armature 112 and a series field 114, both of which are arranged to have extremely low resistance and large current carrying capacity. For example, in a practical circuit, such as shown, a ½ H. P. 3600 R. P. M. motor has a field resistance of .18 ohm and an armature resistance of .64 ohm. This is extremely advantageous in providing full torque capacity at 120 R. P. M. for continuous duty, without even heating up to the permissible maximum.

I find that the use of a D. C. motor having armature and field windings with a resistance value considerably lower than that normally found in a motor of the same power output rating is very advantageous in operation in these systems. Stated in another way, I prefer to use a D. C. motor having speed capabilities considerably higher than actually being used, one which, if uncontrolled on the stated voltage, would speed up greatly. For example, the motor described above on the stated voltage will speed up to about twice the maximum controlled speed. These motors have relatively few turns of relatively heavy conductors in their armature windings. In effect, my systems precisely harness motors with higher speed capabilities to produce better speed regulation and better load-carrying ability than with conventional systems.

Figure 3:
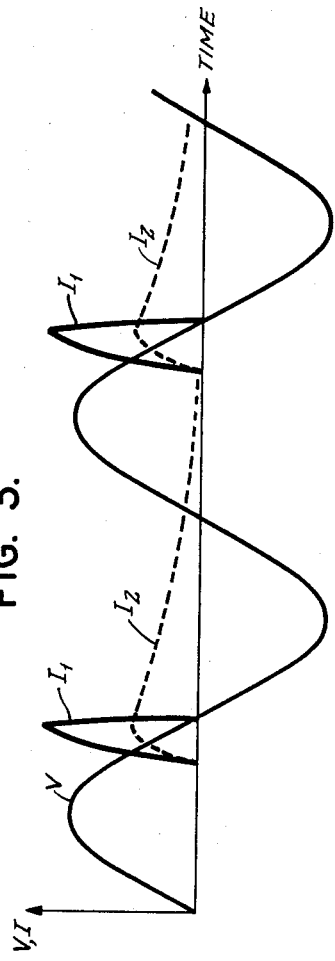
Figure 3 is a plot of voltage and current for purposes of explanation.

To increase further the load-carrying capacity of the motor at reduced speeds, I find it desirable to connect a gaseous rectifier tube 116 across both the field and armature in the inverse direction, i. e., with its cathode 118 connected to the field 114 and its plate 120 connected to the armature 112. At low speeds, assuming that the inverse rectifier is omitted, then the main rectifier 16 conducts for brief periods during the final portion of each positive half cycle of the anode 106, as shown in Figure 3, in which the sine curve V represents the anode voltage of the rectifier, and the solid curve $I_1$ represents the current through the motor (without the inverse rectifier 116). As soon as the thyratron anode voltage reaches the zero reference axis, the current $I_1$ immediately ceases and power input to the motor stops until the next conduction pulse occurs. The motor field flux which was built up during the conduction period of the main rectifier collapses uselessly after conduction ceases.

With the inverse rectifier 116 connected across the motor, advantage is taken of the fact that as soon as conduction through the main rectifier 16 ceases, the field flux begins to decrease, causing a voltage in the forward direction to appear across the field 114, this collapsing field flux also is present within the armature, causing added voltage to appear in the forward direction across the armature, due to the collapsing field flux. These induced voltages overcome the back E. M. F. of the motor and cause current to continue flowing down through the motor and up through the inverse rectifier 116 in a closed loop, much as a flywheel continues to coast. The result is that the energy present in the magnetic field is converted into useful torque. This is another advantage of the extremely low resistance series motor connection, for the closed loop through the inverse rectifier has a total resistance of only a few ohms so that the "flywheel" current continues for an appreciable time. As the field flux decreases, of course, the back E. M. F. also decreases, so that this "flywheel" current continues to flow until the field flux has dropped completely down to its residual value. Useful torque is obtained during this entire period of field flux decay.

In a practical circuit as shown, I find that this "flywheel" current continues for substantially a full cycle. Thus, the initial current pulse can be considerably shorter and of lower peak value, resulting in lower R. M. S. heating effect. Also, since this "flywheel" current acts to oppose rapid field flux decay, the hysteresis and eddy current losses are reduced because the field collapses more gradually, resulting in further reduced heating effect.

The dotted curve $I_2$ represents the current flow through the motor after the inverse rectifier is added. Its advantage over $I_1$ is strikingly apparent.

The curves shown in Figure 3 correspond with a tracing made of an oscilloscope pattern of the current through the motor in the circuit of Figure 2 and is discussed in greater detail later. The same striking improvement in the motor current wave shape applies to the circuit of Figure 1.

The power supply 26 includes a transformer 124 having its secondary 126 connected through a rectifier 127 and current limiting resistor 128, and across a filter condenser 130 to the two terminals 28 and 30. The primary 132 is connected to a pair of lines 134 carrying 110 volt 60 cycle current to which the primary 136 of the bias transformer 104 is also connected. These lines 134 may be connected separately to a suitable A. C. source, but desirably may be connected to the secondary 138 of a step-down transformer 140 having its primary 142 connected across the power mains 13 and 14. The line 13 includes the main on-off switch 144 and a fuse. For convenience, the winding 102 may be on the same core 124 with the winding 126 and the heaters (not shown) for the triodes connected at "X—X." The gaseous rectifiers have heaters (not shown) energized from the transformer 140.

Figure 2:
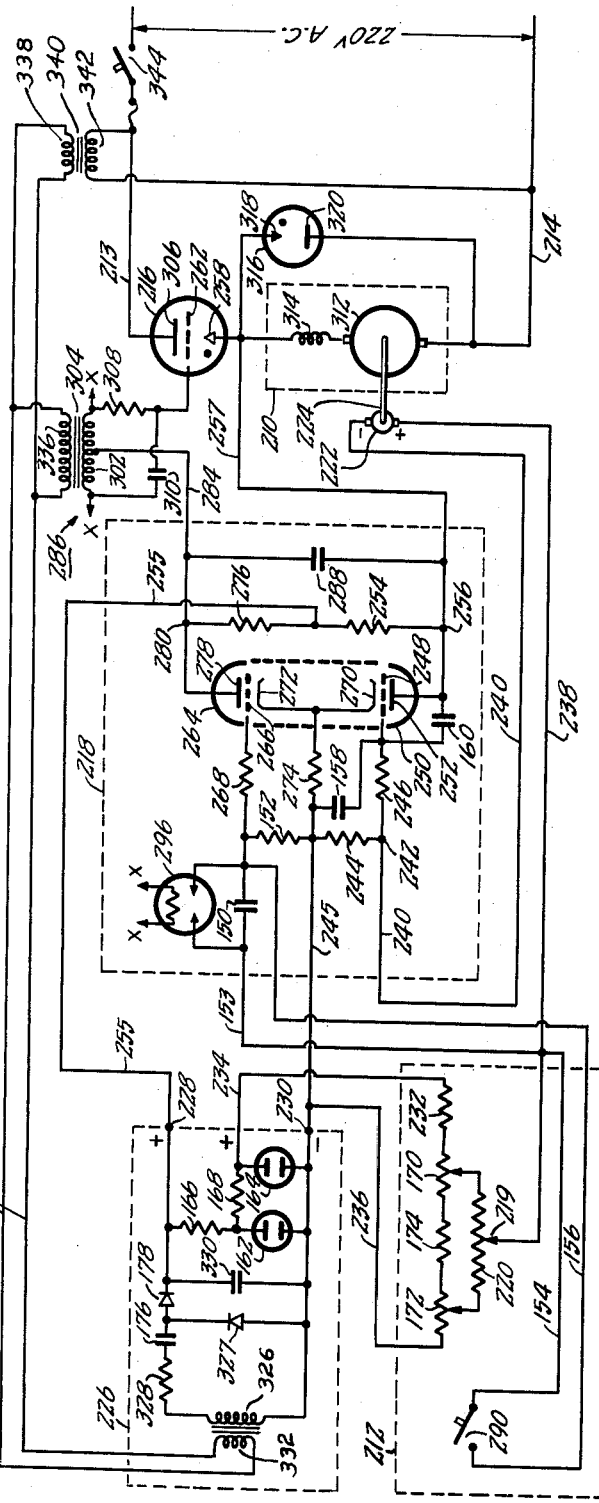
Figure 2 is a schematic circuit diagram of another embodiment of the present invention providing a somewhat greater speed range and even further improved speed regulation.

The control system of Figure 2 is generally similar to that of Figure 1, and only the differences are discussed here. This system provides a 100 to 1 speed range, i. e., 3600 R. P. M. to 36 R. P. M. at full-rated torque output at any speed in this range, with a speed regulation from no-load to full load of only ½ of 1% of rated speed at any setting in this wide range.

In order to improve the commutation and give greater load capacity, particularly at lower speeds, the inverse rectifier tube 316 is connected across both the field 314 and armature 312 of motor 210 as before. Because of the very low resistance of the motor, this inverse rectifier keeps current flowing in the forward direction through the motor substantially at all times as shown in Figure 3. The field flux is thus prevented from complete collapse at all settings.

Using this system with a ¼ H. P. motor and with a speed setting of 1/20 of the base speed, i. e. at only 180 R. P. M., and with full rated torque load the oscilloscope pattern showed that the peak value of the motor current was reduced by the surprisingly large ratio of 10 to 4. Using a very accurately calibrated R. M. S. type meter the R. M. S. value of the current through the motor, i. e.

the R. M. S. value of $I_2$ was 3.0 amps compared with 3.7 amps for $I_1$. This represents a reduction in copper loss heating effect alone by a ratio of 9 to 13.8, a reduction of 35% from the original value for a given load. The effective load carrying capacity for a given amount of temperature rise in the motor under continuous duty is increased by about 50%, because with this system the peak current values rise considerably more slowly with load.

Advantageously, this inverse rectifier produces a reduction in R. M. S. current value through the motor at all speed settings. This improvement becomes progressively greater as the speed setting is reduced. And at speed settings lower than $\frac{1}{20}$ of the base speed, the relative reduction in R. M. S. current is even more startling than that explained above.

Other heat losses are reduced too, which give slightly more load capabilities. The hysteresis and eddy current losses in the field laminations are reduced because the flux variations are slower. Even down as far as $\frac{1}{20}$ of base speed, the field current and field flux are continuous. Also, because of the continuing field the back E. M. F. in the armature is more constant and much better commutation results. All of these factors contribute to greatly enhanced performance over a speed range of 100 to 1.

The amplifier output filter capacitor 288 is connected directly across the plates 252 and 278, and the time delay effect is provided by means of a condenser 150 having one terminal connected between the junction of a grid return resistor 152 for the triode 264 and the grid resistor 268 and its other terminal is connected through a lead 153 to the contact 219 in the control unit. Any sudden changes in setting of the control 219 applies a momentary signal through this condenser 150 to the grid 266. This momentary signal is amplified in the triode 264 and therefore momentarily cancels out any signal change which would otherwise be fed to the main rectifier. As the condenser voltage gradually changes to a value representing the new conditions, the voltage of the thyratron grid is gradually shifted to the new conditions and the motor speed correspondingly changes at a reasonably fast rate, but without excessive current overload. The condenser 150, for example, is .5 microfarad, and its charging path is at least 2 megohms giving a time-constant of about 1 second for response to sudden changes in control setting.

For stand-by conditions, the switch 290 short circuits the condenser 150 through the leads 154 and 156, completely cancelling any changes through the opposed action of the two triodes, and stopping the motor.

The thermal time delay unit 296 is in parallel with the switch 290 across the condenser 150.

In order further to reduce the response of the amplifier 218 to any ripple components in the voltage on the lead 240 from the tachometer, a condenser 158 is connected between the grid 248 and the return lead 245. Added stability and reduced A. C. response is also provided by the plate-to-grid condenser 160, giving negative voltage feedback discrimination against A. C. signal components and even further reducing the A. C. response due to Miller effect.

Providing an extremely stable reference voltage, are a pair of voltage regulator tubes 162 and 164 in the power supply circuit 226. The first of these, 162, is connected in series with a resistor 166 across the filter condenser 330. Thus, a substantially constant voltage is maintained across this first VR tube 162. The second tube 164 is connected in series with a resistor 168 across the tube 162. The result is an extremely precise voltage between the reference leads 234 and 236 to the unit 212.

For precise range setting, the control potentiometer 220 has its terminals connected to the movable contacts of a pair of potentiometers 170 and 172 which are in series with the range limiting resistor 232 and with a resistor 174 therebetween. The potentiometers 170 and 172 are preset for correct speed calibration and the contact 219 is used for control.

A voltage doubler filter circuit, including a condenser 176 in series with the first rectifier 327 and a rectifier 178 in series with the output filter condenser 330, is provided in the power supply 226.

The circuit of Figure 2 provides any speed from 36 R. P. M. to 3600 R. P. M., as mentioned. A change of ±15 volts from 220 volts, produces a speed change of less than 9 R. P. M. (at any motor loading from no load to full load), equivalent to ¼ of 1% of rated motor speed.

Using a precision ten turn potentiometer set initially to give 3600 R. P. M. and measuring the speed at 50% and 25% of the original dial setting shows a motor speed which compares with the theoretical value within ½ of 1% of rated speed. This very slight deviation from exact linearity is due to potentiometer inaccuracies, as well as tachometer inaccuracies, with very little inaccuracy due to the uncomplicated, highly effective control circuit shown.

A change in line voltage of ±44 volts affects the reference voltage from the second VR tube less than ⅛ of 1%.

As used herein, the term "direct sensing means for motor speed" and variations of it, are intended to include both means directly coupled to the motor and sensing means operating through intermediate means whose characteristics are a predetermined function of motor speed.

"Controllable unidirectional current means" is intended to include sources of unidirectional current, both intermittent and steady, from which the amount of electrical power transmitted can be controlled.

"Adjustable speed" is intended to include automatic, as well as manual speed variation.

The term "D. C. motor" is intended to include all types of cummutator motors adaptable for unidirectional current energization, regardless of whether the motor may also be suitable for alternating current energization.

From the foregoing it will be understood that the embodiments of the present invention described above are well suited to provide the advantages set forth, and since many possible embodiments may be made of the various features of this invention and as the methods herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. An electric motor speed control system comprising a D. C. motor, controllable unidirectional current means connected to said motor and transmitting electrical power thereto, a D. C. tachometer responsive to the speed of said motor and generating a unidirectional signal as a function of motor speed, an adjustable source of direct voltage corresponding to the desired motor speed, first circuit means comparing said signal and adjustable voltages and producing a unidirectional current error signal as a function of the difference therebetween, a push-pull amplifier including first and second substantially identical amplifier units arranged in push-pull relationship, said first circuit means coupling said error signal to said amplifier, said first amplifier unit amplifying said error signal and any ripple components thereof with a first phase relationship, said second amplifier unit amplifying said error signal and any ripple components thereof with a second phase relationship opposite to said first phase relationship, capacitance means in circuit across corresponding portions of said first and second amplifier units producing effective combination of said ripple components being amplified in phase opposition for cancellation thereof, and second circuit means coupling the output of said first and second amplifier units to said controllable unidirectional current means, said controllable current means being responsive to the output of said units and controlling the amount of power transmitted to said motor in response thereto.

2. An adjustable speed electric motor system comprising a D. C. motor having field and armature windings of low resistance connected in series, a D. C. tachometer directly sensing the speed of said motor, said tachometer generating a unidirectional current signal as a function of motor speed, an adjustable source of direct reference voltage representing the desired motor speed, first circuit means comparing said signal and reference voltages and producing a unidirectional current error signal as a function of the difference therebetween, an amplifier having an input terminal and first and second output terminals and including a common return circuit and first and second substantially identical amplifier units in push-pull relationship amplifying said error signal and any ripple components thereof, the outputs of said first and second amplifiers being connected to said first and second output terminals, respectively, first capacitance means in circuit between said output terminals, second capacitance means in circuit between said input terminal and said common return circuit, said first circuit means being connected to said amplifier input terminal and feeding said error signal thereto, a motor energizing circuit including an alternating power line and a thyratron having a grid and a plate-cathode circuit connected to said power line and controlling the power supplied to said motor, and second circuit means coupling said first and second output terminals in circuit with the grid and cathode of said thyratron effectively to control the grid-cathode voltage thereof.

3. An adjustable-speed electric motor system as claimed in claim 2 and wherein said first amplifier unit is a triode, and a condenser connected between the plate and grid thereof for increasing the Miller effect of said tube, whereby to discriminate further against ripple components of the error signal.

4. An adjustable-speed electric motor system as claimed in claim 2 and wherein said first amplifier unit has its input connected to said input terminal, third capacitance means in circuit between the input of said second amplifier unit and said adjustable source of reference voltage, and resistance means between the input of said second amplifier unit and the common return circuit, whereby sudden changes in said reference voltage are coupled through said third capacitance means to said second amplifier unit, the output signal of said second amplifier unit tending to move the voltage of said grid in a negative direction relative to the cathode, whereby to reduce the rate of increase in power supplied to said motor below that called for by sudden changes in reference voltage.

5. In an electric motor speed control system of the type using controllable unidirectional current conduction means to control the energization of a direct current type of motor during alternate half cycles from an alternating current source, the improvement providing precisely controlled speed over a wide range of speed while enabling markedly increased load capacity to be obtained throughout said range of speed, said improvement including a series motor having a main series field winding of relatively low resistance connected directly in series with the armature winding, said series motor having significantly higher speed capabilities than the maximum speed in said range, controllable unidirectional current conduction means having a control terminal, said series motor being connected in series with said controllable unidirectional conduction means to a source of alternating current, inverse unidirectional current conduction means connected directly across said main series field and armature windings and having a direction of conduction opposite to the direction of conduction of said controllable unidirectional conduction means, speed sensing means responsive to the speed of rotation of said motor and producing an electrical signal as a predetermined function of the speed thereof, and a speed control circuit having its input coupled to said speed sensing means and having its output coupled to said control terminal, said speed control circuit being responsive to said electrical signal and responsive to an externally adjustable speed reference signal and controlling the conduction through said controllable unidirectional conduction means in accordance with a function of said electrical signal and said speed reference signal.

6. An adjustable-speed electric motor control system providing speed adjustment over an extended range from a minimum desired speed up to a maximum desired speed, said system utilizing a series motor having a main series field winding and armature winding connected directly in series, said motor having a significantly higher speed capability than said maximum speed, said system comprising said series motor, an alternating current source of predetermined voltage, controllable unidirectional current conduction means connected directly in series with said field and armature windings, said field and armature windings and said controllable unidirectional current conduction means being connected directly across said A. C. source, said motor having a speed of at least about twice said maximum speed when connected directly across said source, second unidirectional current conduction means being connected directly across said motor and having a direction of conduction inverse with respect to the direction of conduction of said controllable unidirectional current conduction means, said main series field winding, said armature winding, and said inverse unidirectional current conduction means completely defining a closed loop circuit.

7. An electric motor speed control system for providing adjustable speed over an extended range of at least 30 to 1 comprising a series motor having main series field and armature windings connected in series, an alternating current source, controllable rectifier means in series with said field and armature windings and connecting said field and armature windings directly through said rectifier means across said A. C. source, said controllable unidirectional current conduction means energizing said motor during alternate half-cycles, speed sensing means responsive to the speed of said motor and producing an electrical signal as a function of motor speed, an adjustable source of voltage representing the desired motor speed, first circuit means comparing said motor speed signal and said adjustable voltage and producing a control signal as a function of the deviation of the motor speed signal from the adjustable voltage and second circuit means feeding said control signal to said controllable rectifier for controlling the energization of the motor during said alternate half-cycles, and an inverse rectifier connected directly across said series motor forming a closed series loop including only said main series field and armature windings and said inverse rectifier, said inverse rectifier utilizing the collapsing field flux to maintain current flow through the armature and conducting current around said closed series loop after the cessation of each alternate half-cycle, said current flow maintaining useful torque output from said armature during the periods between said alternate half-cycles.

8. An adjustable speed control system for a D. C. type electric motor having field and armature winding portions connected in series comprising said motor, a source of alternating current voltage, controllable rectifier means connected in series with said field and armature winding portions across said A. C. source, said rectifier means having first and second control terminals adapted to have a control voltage applied therebetween for controlling the energization of said motor, speed sensing means responsive to the speed of said motor and arranged to produce an electrical signal whose magnitude is a function of motor speed, an adjustable source of voltage representing the desired motor speed, first circuit means comparing said motor speed signal and said adjustable voltage and producing a unidirectional current error signal as a function of the difference therebetween, an amplifier responsive to said error signal and having first and second substantially identical amplifying units arranged in push-pull relationship and including first and second output terminals, respectively, second circuit means combining any alternating components of said error signal being amplified by said respective units in opposition and providing substantial gain across said output terminals for direct current components of said error signal and substantial attenuation across said output terminals for said alternating components, third circuit means coupling said first and second output terminals to said first and second control terminals, respectively, and an inverse rectifier connected directly across said field and armature winding portions.

9. An adjustable-speed electric motor control system providing speed adjustment over an extended range from a minimum desired speed up to a maximum desired speed, said system utilizing a D. C. type motor having field and armature winding portions connected in series, said motor having a significantly higher speed capability than said maximum speed and being effectively harnessed by said control system to provide full rated torque over said range under continuous duty without overheating, said system comprising said motor, an alternating current source of predetermined voltage, controllable rectifier means connected in series with said field and armature winding portions, said field and armature winding portions and said controllable rectifier means being connected in series directly across said A. C. source, said field and armature winding portions having substantially lower resistance than a conventional motor of the same power output and having a speed of at least about twice said maximum speed when connected directly across said A. C. source, speed sensing means responsive to the speed of said motor and arranged to produce a signal whose magnitude is a function of motor speed, an adjustable control voltage source representing the desired motor speed, first circuit means comparing said motor speed signal and said control voltage and producing a unidirectional current error signal as a function of the difference therebetween, an amplifier including first and second similar amplifier units arranged in push-pull relationship, said first circuit means coupling said error signal into said amplifier units, said amplifier units respectively amplifying said error signal and any ripple components thereof with respective opposite phase relationships, second circuit means combining any ripple components of said error signal being amplified by said respective units in opposition and providing substantial gain across the output terminals of said units for direct current components of said error signal and providing substantial attenuation across said output terminals for said alternating components, and third circuit means coupling the output of said first and second amplifier units to said controllable rectifier means.

10. An adjustable-speed electric motor control system providing speed adjustment over an extended range from a minimum desired speed up to a maximum desired speed, said system utilizing a D. C. type motor having field and armature winding portions connected in series, said motor having a significantly higher speed capability than said maximum speed and being effectively harnessed by said control system to provide full rated torque over said range under continuous duty without overheating, said system comprising said motor, an alternating current source of predetermined voltage, controllable rectifier means connected in series with said field and armature winding portions, said field and armature winding portions and said controllable rectifier means being connected in series directly across said A. C. source, said field and armature winding portions having substantially lower resistance than a conventional motor of the same power output and having a speed of at least about twice said maximum speed when connected directly across said A. C. source, speed sensing means responsive to the speed of said motor and arranged to produce a signal whose magnitude is a function of motor speed, an adjustable control voltage source representing the desired motor speed, first circuit means comparing said motor speed signal and said control voltage and producing a unidirectional current error signal as a function of the difference therebetween, an amplifier including first and second similar amplifier units arranged in push-pull relationship, said first circuit means coupling said error signal into said amplifier units, said amplifier units respectively amplifying said error signal and any ripple components thereof with respective opposite phase relationships, second circuit means combining any ripple components of said error signal being amplified by said respective units in opposition and providing substantial gain across the output terminals of said units for direct current components of said error signal and providing substantial attenuation across said output terminals for said alternating components, third circuit means coupling the output of said first and second amplifier units to said controllable rectifier means, and an inverse rectifier connected directly across said field and armature winding portions.

11. An adjustable speed control system for a D. C. type electric motor having field and armature winding portions connected in series comprising said motor, a source of alternating current voltage, controllable rectifier means connected in series with said field and armature winding portions across said A. C. source, said rectifier means having first and second control terminals adapted to have a control voltage applied therebetween for controlling the energization of said motor, speed sensing means responsive to the speed of said motor and arranged to produce an electrical signal whose magnitude is a function of motor speed, an adjustable source of voltage representing the desired motor speed, first circuit means comparing said motor speed signal and said adjustable voltage and producing a unidirectional current error signal as a function of the difference therebetween, an amplifier responsive to said error signal and having first and second substantially identical amplifying units arranged in push-pull relationship and including first and second output terminals, respectively, a condenser in circuit across said output terminals providing substantial gain across said output terminals for direct current components of said error signal and substantial attenuation across said output terminals for said alternating components, second circuit means coupling said first and second output terminals to said first and second control terminals, respectively, and an inverse rectifier connected directly across said field and armature winding portions.

12. An adjustable speed control system utilizing an alternating current source for energizing a D. C. type electric motor having field and armature winding portions and wherein the controlled speed of the motor is substantially independent of wide fluctuations in the voltage of the alternating current source, said system comprising said motor, a source of alternating current voltage, controllable rectifier means connected in series with said motor across said A. C. source, said rectifier means having a control terminal adapted to have a control voltage applied thereto for controlling the energization of said motor, speed sensing means responsive to the speed of said motor and arranged to produce an electrical signal as a function of motor speed, an adjustable source of voltage representing the desired motor speed, first circuit means comparing said motor speed signal and said adjustable voltage and producing a control signal as a function of the difference therebetween and feeding said control signal to said control terminal for controlling the energization of said motor, said adjustable source of voltage including second rectifier means adapted to be connected to an A. C. source, filter means connected to said rectifier means, a first resistor in circuit in series with a first voltage regulator tube connected to the output of said filter means, and a second resistor in a second circuit in series with a second voltage regulator tube, said second circuit being connected across said first tube whereby the voltage fed to said second circuit is regulated by said first tube, and potentiometer means across said second tube having a movable contact supplying said adjustable voltage.

13. An adjustable-speed electric motor control system providing speed adjustment of the motor over a range, said system including a series motor having a main series field winding and an armature winding connected directly in series with each other, a controllable source of spaced unidirectional current pulses of predetermined polarity connected in series with said motor, inverse unidirectional flow current conduction means connected directly across said series motor in the inverse direction with respect to the polarity of the applied pulses, said inverse unidirectional flow current conduction means, said main series field winding, and said armature winding forming a closed electrical loop circuit, a speed sensing mechanism driven by said motor for forming a signal as a function of motor speed, and control circuit means connected to said speed sensing mechanism and responsive to the signal therefrom and connected to said controllable source of pulses for adjusting the speed of the motor.

14. An adjustable-speed electric motor control system providing accurate speed adjustment of the motor including a direct current type of motor, controllable unidirectional current means connected to said motor for transmitting electrical power thereto, said unidirectional current means having first and second control terminals adapted to have a control signal applied therebetween for controlling the conduction therethrough, direct sensing speed sensing means coupled to said motor and arranged to produce an electrical signal whose magnitude is a function of the speed of the motor, a speed control circuit connected to said speed sensing means and including a push-pull amplifier having first and second substantially identical amplifying units in push-pull relationship with first and second output terminals, respectively, first circuit means connecting said first output terminal to said first control terminals, second circuit means connecting said second output terminal to said second control terminal, and capacitance means connected between said first and second circuit means.

References Cited in the file of this patent

UNITED STATES PATENTS

| | | |
|---|---|---|
| 2,530,993 | Roman | Nov. 21, 1950 |
| 2,546,014 | Puchlowski et al. | Mar. 20, 1951 |
| 2,550,105 | Cotner | Apr. 24, 1951 |
| 2,568,701 | Arnold | Sept. 25, 1951 |

FOREIGN PATENTS

| | | |
|---|---|---|
| 432,203 | Great Britain | July 22, 1935 |
| 659,865 | Germany | May 12, 1938 |
| 712,539 | Germany | Oct. 21, 1941 |